April 4, 1961

J. PARKER ET AL 2,978,344

PAINT RECOVERY METHOD

Filed Sept. 19, 1956

INVENTORS
Joseph Parker
Wallace N. Knutsen
BY
Donald P. Smith
Attorney

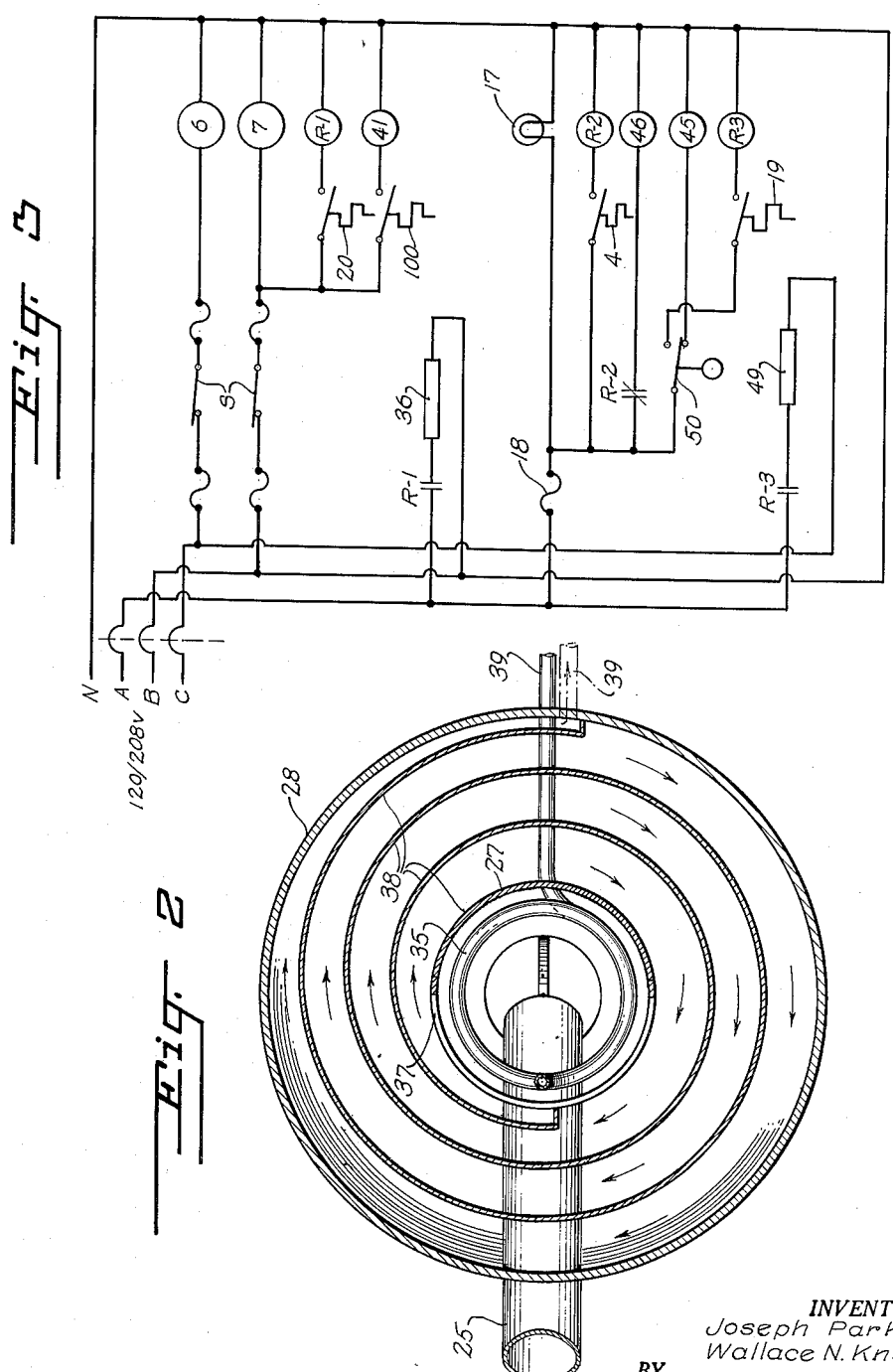

United States Patent Office 2,978,344
Patented Apr. 4, 1961

2,978,344
PAINT RECOVERY METHOD

Joseph Parker, Washington, D.C., and Wallace N. Knutsen, Alexandria, Va., assignors, by mesne assignments, to Illinois Tool Works, Chicago, Ill., a corporation of Illinois Filed Sept. 19, 1956, Ser. No. 610,840

4 Claims. (Cl. 106—193)

The present invention relates to a method and an apparatus for the recovery of sprayed material and is directed more particularly to a new and useful method and structure for the recovery of excess sprayed material containing metallic silver and provides for the reuse of this material in subsequent coating operations. We have discovered that material containing metallic silver may be recovered in a manner which is rapid, efficient, and very economical and that the material obtained in the recovery process may be directly reused without isolating any of the components thereof prior to such reuse.

In present day automation techniques especially as related to the fabrication of electronic components it has been found expeditious to apply coating materials to surfaces by several spraying processes. For example in the manufacture by automation machinery of modules consisting of a series of ceramic wafers joined by metallic riser wires it is necessary to bond the metal to the ceramic surface or edge. This is done by initially applying by spraying techniques a coating of silver to the portion of the ceramic plate and thereafter applying a low melting point metallic alloy such as solder to the silver coating which bonds the wire to the ceramic very firmly. As examples of machinery designed to apply the metallic silver coating to portions of the ceramic, reference is made to the application of Herman A. Schmidt for Article Sprayer, Serial Number 585,705, now Patent Number 2,832,308, dated April 29, 1958; and to the co-pending application of Charles C. Rayburn et al. for Pattern Printer, Serial Number 594,184, now Patent No. 2,947,247. The above applications respectively illustrate apparatus for spray coating selected portions of ceramic with metallic silver prior to the application of a low melting point metallic alloy. The composition sprayed against the ceramic consists of minutely divided metallic silver, which may range in diameter from about 5.0 to about 0.005 micron, a water soluble resin whose aqueous solubility varies inversely with temperature, and a finely divided frit. When the above described composition of material is sprayed upon the selected portions of the ceramic the resin acts as a temporary bonding agent to cause adhesion between the metallic silver particles and the ceramic. The ceramic pieces are thereafter fired in a furnace at an elevated temperature which causes the frit to melt, forming puddles in which the metallic silver is immersed and the resin is thermally decomposed since the temperature is considerably above the oxidizing level. After cooling the frit solidifies and holds metallic silver particles in contact one with another and bonded to the ceramic piece. This provides, depending on the desired application, either a conductive area to form a condenser plate or a surface which will receive and adhere to metallic alloys of the solder type.

As will be readily appreciated a substantial amount of the sprayed composition of material is not here utilized but impinges against the masking used to conceal from the spray those portions which are not to be coated. It is accordingly a broad object of this invention to recover this unused material for reuse in subsequent spraying operations.

A further broad object of this invention is the provision of a process of recovering sprayed coating composition comprising the steps of forming a slurry, confining the slurry within a reservoir, raising the temperature of the slurry and establishing a flow to permit a withdrawal of suspended particles and to permit colloidal solid phase separation.

A still further object of the invention is the provision of a method for the recovery of excess sprayed material which comprises the steps of treating the material with water to form a slurry, confining the slurry within a reservoir to permit settling of large particles and raising the temperature of the slurry to produce a precipitate to separate the solid phase of a colloidal solution formed by the water treatment step.

It is a yet still further object of this invention to provide an apparatus for the purpose of separating materials by using a flocculent precipitate to separate the solid phase of a colloidal solution.

It is another object of this invention to provide an apparatus for the recovery of excess sprayed material which is efficient in operation, economical in use, and which requires no further treatment of the material prior to its reuse.

Summarily stated, the invention consists of gathering the above described composition after spraying selected areas on a ceramic wafer by treatment with water to dissolve the resin and form a colloidal solution and a system in suspension with the solid particles, and the use of the included resin to form a flocculent precipitate at a predetermined and controlled temperature which will fall to separate the solid phase of the colloidal solution and separate the larger solids held in suspension. The treatment water is maintained at a relatively low temperature to insure that the resin will readily go into solution, thereafter the slurry so formed is admitted into a reservoir for initial separation of particles in suspension, the temperature at the top of the reservoir is thereafter increased to a point at which the resin is insoluble whereby it precipitates and falls to separate the solid phase of the colloidal solution. A spiral baffle is provided from the center of the reservoir to the outer boundary area and a structure is provided to produce a control flow from the center outward to permit additional settling of particles in suspension and further withdrawal of the colloidal solid phase.

An illustrative embodiment of the invention is shown in the accompanying drawings in which:

Figure 2 is a top plan view taken on lines 2—2 of Figure 1 and looking in the direction of the arrows and Figure 3 is a schematic wiring diagram showing the control circuit for the apparatus of Figure 1.

Figure 1:
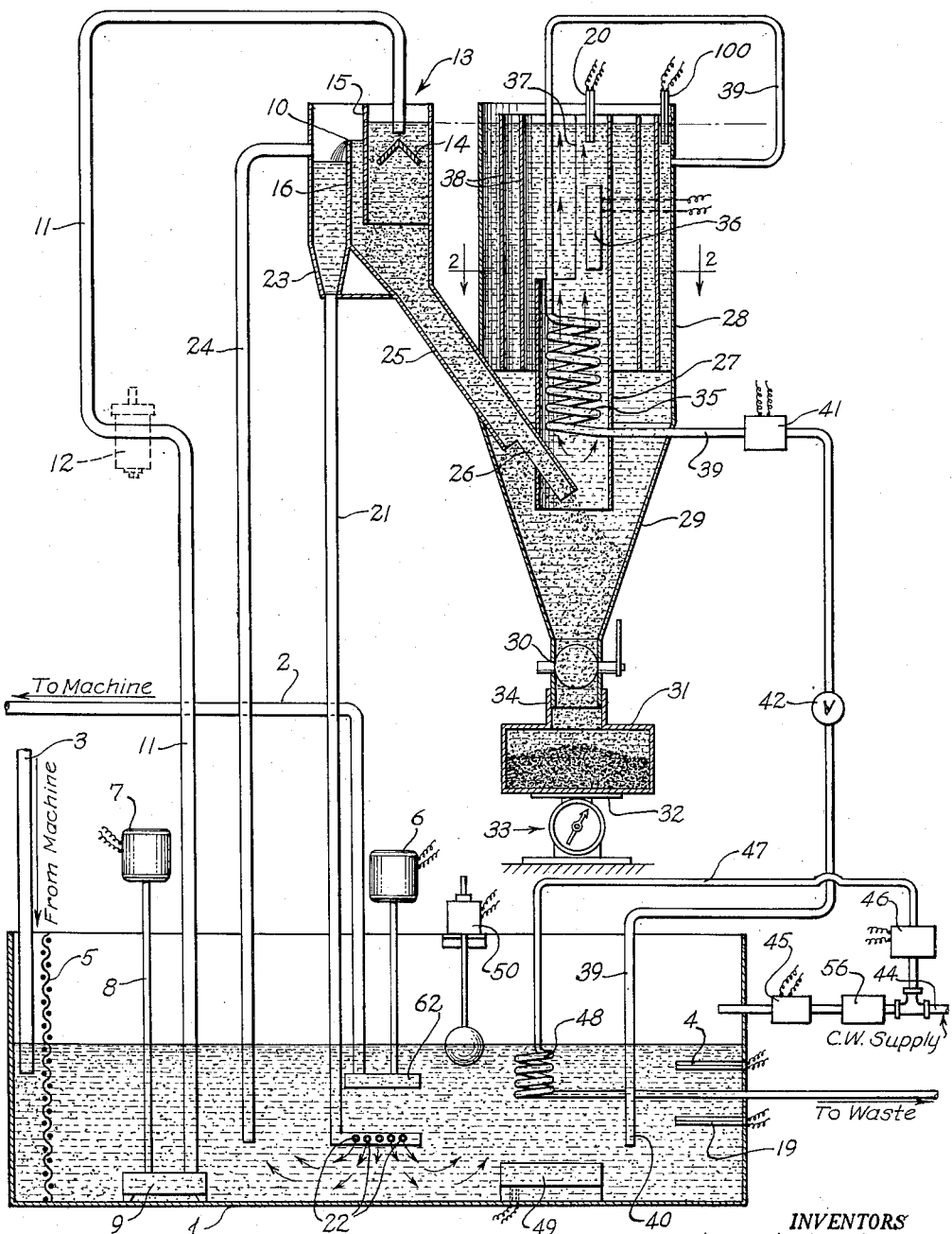
Figure 1 is a diagrammatic side elevation view partly in section of apparatus for the recovery of excess sprayed material.

Referring now to the drawings wherein like structures are designated by corresponding reference characters, 1 indicates a tank to receive and store the slurry as taken from the automatic fabrication machinery (not shown). It will be understood that the excess sprayed material is treated with a water spray at the fabricating machine or the material may be manually removed from the machine and placed in tank 1. A pipe 3 is connected to the output of such machine and is formed to discharge the slurry behind screen 5 of relatively fine mesh for the removal of large dirt particles or ceramic chips which may have inadvertently fallen into the treating water bath. A motor 7 is arranged to drive pump 9 through shaft 8, the output of the pump is connected to pipe 11 which may optionally have a strainer 12 connected therein to remove further dirt particles as may be required. Pipe 11 terminates in a rectangular hopper 13 and the mouth of the pipe 11 is disposed in register with the apex of an angular baffle 14 to spread the discharge flow out to the sides to prevent foaming and to prevent undue forcing of the newly added slurry to the bottom. Hopper 13 has an entrance section 15 with an open bottom portion, and a baffle 16 terminates at the top to form a weir 10 thereby providing an overflow for the fluid which does not pass through the recovery cycle. Pipe 21 leads from the bottom of a portion 23 back to tank 1. At the end of pipe 21 is an enlarged portion having holes 22 formed therein for the outlet of the water from the overflow. The motion of the slurry through the holes 22 will tend to stir the residual slurry in the tank to prevent settling at this station. An overflow pipe 24 is provided to prevent spilling over in the event the holes 22 become clogged or otherwise reduced in capacity. A motor 6 drives pump 62 to return the tank contents to the machines through pipe 2 for further washing of excess sprayed material.

The hopper 13 flares into an elongated chute 25 which has a portion thereof cut away substantially as shown at 26 and discharges at the lower part of a cylinder 27 affixed at the axis of symmetry of a cylindrical reservoir 28 having the lower end in the shape of a truncated cone 29. At the mouth of the cone is manually operated valve 30 which opens into a removable container 31 normally resting on the platform 32 of a balance 33 used for indicating the density of material reclaimed and ready for reuse. In this connection it will be noted that the neck 34 of container 31 is slidably fitted onto the discharge mouth of the truncated cone so that after closing valve 30 the container may be readily weighed, removed, and a fresh one substituted.

Within the cylinder 27 is fixed a heating coil 35 and an electrical heater 36 for a purpose to be later explained. Thermostat 20 controls the operation of heater 36 and thermostat 100 controls heating coil 35 by operating solenoid valve 41. A segment 37 is removed from the cylinder substantially as shown, and a spiral baffle 38 surrounds cylinder 27 to provide a confined flow of the slurry from the center of the reservoir through segment 37 and to the outer boundary area. A pipe 39 leads from the outer boundary area of reservoir 28 and connects to the preheating coil 35. A solenoid valve 41 is disposed in line 39 at the outlet of heating coil 35 and a manually flow control valve 42 is affixed therein immediately prior to its discharge point back into tank 1 as at 40. Additional water as needed is supplied from cold water supply pipe 44 leading to a strainer 56 and solenoid valve 45 for the replenishment of water passed off as vapor. Connected in parallel is solenoid valve 46 fixed in pipe 47 connecting to cooling coil 48 arranged below the water level in tank 1 to reduce the temperature thereof as required by cooling thermostat 4. Heating coils 49 are fixed below the water level and act to raise the temperature of the slurry responsive to demand of heating thermostat 19. A float level valve 50 is arranged to actuate valve 45 and maintain the slurry level in the tank. A thermostat 4 responsive to temperature rises above a predetermined level is depended upon to actuate solenoid valve 46 to pass low temperature water through coil 48. Thermostats 4 and 19 interact through the respective heater and cooling coil to keep the temperature in the tank between 95°–104° F.

Figure 3 illustrates the wiring diagram of the system. A three phase four wire service is used to supply power to the electrical portion of the system, 120 volts being available between any phase and neutral and 208 volts being available from phase to phase. Pump motors 6 and 7 are connected between phases c and b and neutral substantially as shown and are started and stopped by fused switches S. Thermostat 20 used to actuate heater 36 connects coil R1 between phase B and neutral to close contact R1 and energize the heater. Thermostat 100 used to connect solenoid valve 41 between phase B and neutral. A pilot light 17 indicates to the operator that fuse 18 is good and the appurtenances supplied with current through fuse 18 are energized. Thermostat 4, controlling coil R2 and valve 46 and thermostat 19 controlling coil R3 and heater 49 are connected in parallel, and float switch 50 is arranged to disconnect the heater 49 by opening relay R3 when the water level falls below a predetermined value. Upon replenishment of the water supply through valve 45, float switch 50 reconnects thermostat 19 to thereby reenergize, if need be, the heater 49.

The addition of a water soluble resin such as polyvinyl alcohol, carboxymethyl cellulose, or methylated cellulose to a composition containing finely divided metal to be sprayed acts as a temporary bonding agent prior to firing between the metal and the surface for that portion of the spray that impacts against the selected surface; the portion of the spray that is to be reclaimed also includes this resin and the inverse aqueous solubility characteristic with respect to temperature is used to separate and reclaim the excess sprayed material by carefully controlling the temperature of slurry formed as a result of water treatment of the excess material so that a precipitate is caused to form and fall at a predetermined location. Our invention, it will be understood applies to any material which is desired to be recovered from a spraying or coating process; however as an illustrative example our material comprises methylated cellulose, metallic silver, and frit. After the spraying cycle is completed the masking and machine is washed with relatively low temperature (95°–104° F.) water and the material readily forms a slurry consisting of the methylated cellulose in solution, and a colloidal system of fine particles of metallic silver and frit, together with larger particles of silver and frit in suspension. Methylated cellulose is soluble in water at normal room temperatures, say 100° F., but becomes insoluble at from about 180°–200° F., to form a flocculent precipitate or jell. Since the slurry is kept in an agitated state at all portions of the system except within the control reservoir the larger particles do not settle out and, as is well understood, a colloidal solution will not settle out except over an extremely long period of time.

Referring now to Figure 1 the slurry returns from the machine through pipe 3 and circulates through screen 5 after which is picked up by pump 9 and sent to pipe 11 into hopper 13. The capacity of the pump 7 being larger than the amount of liquid drawn off from the cycle return pipe 39 a small portion only will pass down chute 25 and the remainder will spill over weir 10 and returning via pipe 21 and out through ports 22 to thereby agitate the tank slurry and keep it in motion. That portion of the slurry that passes down chute 25, continues on and approaches the terminus of the chute at the cutaway portion, reference character 26. The flow within the chute is slow and a portion of the relatively heavier suspended particles will begin to settle out and fall to the bottom of the truncated cone 29. Cylinder 27, disposed over the mouth of chute 25 has thermostat 20, heaters 36, and heating coil 35 positioned therein to raise the temperature of the slurry entering the cylinder bottom to between 180°–200° F. and thereby decrease its density causing it to rise. A siphon flow is established through pipe 39 prior to the start of the cycle which draws off heated water in small quantities from the outer boundary area of the control reservoir 28 and passes it through heating coil 35 under the control of valve 41 back to the tank 1. Thermostat 100 is adjusted to close valve 41 to stop the flow when the temperature falls below 180° F. This is an automatic operation and will stop the flow until heater 36 again raises the temperature. Closing the valve also insures that the syphon effect is not lost when it is desired to restart the cycle. Figure 2 illustrates the confined spiral flow within reservoir 28 showing where the slurry leaves the cylinder 27 through cutout segment 37 and flows spirally through the spiral labyrinth 38 to be passed to pipe 39. It will be appreciated that this spiral flow is small in magnitude and the slurry is fairly tranquil within the labyrinth. Upon raising the temperature of the slurry at the top of cylinder 27 beyond the point at which the methylated cellulose, having an inverse temperature characteristic, will remain in solution it forms a flocculent precipitate which upon slowly falling to the bottom will separate out the solid phase of the colloidal solution and in addition force withdrawal of suspended particles. This temperature is maintained substantially constant throughout the spiral labyrinth such that during the flow from cylinder 27 to the outer boundary layer of reservoir 28 the precipitate continues to fall thereby causing additional withdrawal of suspended particles and additional separation of the colloidal solution solid phase. The spiral labyrinth being open at the bottom permits the precipitate to fall therethrough to carry with it the solids and to collect them within container 31. When scale 33 indicates a predetermined value the operator knows that container 31 is full or substantially full of the reclaimed sprayed material. Upon closing valve 30 the container 31 may be slidably removed and an empty container substituted therefor.

Since the precipitation and solution of the methylated cellulose in water are reversible processes it is a simple matter to reuse the reclaimed material by merely mixing it with water, as needed, at a lower temperature to dissolve the methylated cellulose and reform a colloidal solution for the next spraying operation.

The essence then of the operation of the organization is temperature control and heating element 36, heating coil 35, valve 41 and thermostats 20 and 100 interact to maintain the slurry at the cellulose precipitation temperature of 180°–200° F. The temperature of the slurry in tank 1 is maintained between 95°–104° F. by thermostat 4 and 19 controlling solenoid valve 46 and heater 49 respectively. This lower temperature insures that the methylated cellulose will remain in solution and the agitation created by the overflow emerging from ports 22 keep the suspended solids from settling. The result is that all separating actions are forced to take place within the confines of reservoir 28 so that the reclaimed material may be easily gathered for reuse.

Although but one specific embodiment of the invention is herein shown and described it will be understood that various changes in the sequence of operation, structure, steps, and materials employed may be made without the departing from the spirit of the invention.

We claim:

1. The method of recovering excess paint spray material having metallic particles in a water-soluble carrier whose solubility varies inversely with temperature so as to gel upon heating, which comprises mixing the excess paint spray material with cool water to form a slurry, heating the slurry to gel said carrier, removing excess water from the slurry, and then cooling the slurry to dissolve said carrier.

2. The method of recovering excess paint spray material having particles of silver and frit in a water-soluble cellulose ether whose solubility varies inversely with temperature, which comprises treating the paint spray material with cool water to dissolve the cellulose ether and form a slurry, heating the slurry to gel the cellulose ether, removing excess water from the slurry, and then cooling the slurry to dissolve the cellulose ether.

3. The method of recovering excess paint spray material having particles of silver and frit in a water-soluble cellulose ether whose solubility varies inversely with temperature, which comprises mixing the paint spray material with cool water to dissolve the cellulose ether and to form a slurry of a consistency wherein the cellulose ether gells upon heating of the slurry to a temperature above 180° F., heating the slurry to gel the cellulose ether, removing excess water from the slurry, and then cooling the slurry to dissolve the cellulose ether.

4. The method of recovering excess paint spray material having particles of silver and frit in a water-soluble cellulose ether whose solubility varies inversely with temperature, which comprises mixing cool water with the material to dissolve the cellulose ether to form a slurry, continuously feeding the slurry by gravity into a separator tank, heating the slurry adjacent to the upper end of the tank to obtain a cellulose ether gel of a density exceeding that of the slurry, continuously removing excess water from the slurry at the upper end of the tank, removing the slurry from the bottom of the tank, and then cooling the removed slurry to dissolve the cellulose ether gel.

References Cited in the file of this patent

UNITED STATES PATENTS

| | | |
|---|---|---|
| 938,779 | Morrison | Nov. 2, 1909 |
| 1,641,843 | Fisher | Sept. 6, 1927 |
| 1,953,868 | Richter et al. | Apr. 3, 1938 |
| 2,248,061 | Burch | July 8, 1941 |
| 2,328,361 | Sanders | Aug. 31, 1943 |

OTHER REFERENCES

Ott et al.: "High Polymers," vol. 5, 2nd Ed. (1954), pages 908–9 (Interscience Publishers, Inc., New York, N.Y.).